(12) United States Patent
Gu

(10) Patent No.: US 11,239,484 B2
(45) Date of Patent: Feb. 1, 2022

(54) FUEL CELL SYSTEM AND OPERATION METHOD THEREOF

(71) Applicant: JIANGSU HORIZON NEW ENERGY TECHNOLOGIES CO. LTD., Zhangjiagang (CN)

(72) Inventor: Zhijun Gu, Shanghai (CN)

(73) Assignees: JIANGSU HORIZON NEW ENERGY TECHNOLOGIES CO. LTD., Zhangjiagang (CN); HYZON MOTORS INC., Honeoye Falls, NY (US)

( * ) Notice: Subject to any disclaimer, the term of this patent is extended or adjusted under 35 U.S.C. 154(b) by 0 days.

(21) Appl. No.: 16/864,494

(22) Filed: May 1, 2020

(65) Prior Publication Data

US 2021/0344031 A1    Nov. 4, 2021

(51) Int. Cl.
| | |
|---|---|
| *H01M 8/22* | (2006.01) |
| *H01M 8/04082* | (2016.01) |
| *H01M 8/04089* | (2016.01) |
| *H01M 8/0271* | (2016.01) |

(52) U.S. Cl.
CPC .......... *H01M 8/22* (2013.01); *H01M 8/0271* (2013.01); *H01M 8/04089* (2013.01); *H01M 8/04216* (2013.01)

(58) Field of Classification Search
CPC ..... H01M 8/22; H01M 8/0271; H01M 8/0489
See application file for complete search history.

(56) References Cited

U.S. PATENT DOCUMENTS

| | | | | |
|---|---|---|---|---|
| 6,881,510 B1* | 4/2005 | Gyoten | ............... | H01M 8/0258 |
| | | | | 429/431 |
| 2003/0211372 A1* | 11/2003 | Adams | .............. | H01M 8/04951 |
| | | | | 320/101 |
| 2007/0154743 A1* | 7/2007 | Zhang | ............... | H01M 8/04238 |
| | | | | 429/431 |
| 2015/0140458 A1* | 5/2015 | Marsh | ................. | H01M 8/0438 |
| | | | | 429/410 |

FOREIGN PATENT DOCUMENTS

CN    110504470 A    11/2019

* cited by examiner

*Primary Examiner* — Olatunji A Godo
(74) *Attorney, Agent, or Firm* — Jacob M. Ward; Ward Law Office LLC

(57) ABSTRACT

A fuel cell system and a method for operating the fuel cell system, wherein the fuel cell system includes a fuel cell, a controller, a switch, an oxygen supply device and an output circuit. The fuel cell includes an anode and a cathode. The fuel cell is a cathode enclosed fuel cell. The controller is used to drive control signal for adjusting the electrochemical metering ratio of oxygen flow, supplied by the oxygen supply device, to output current, wherein the electrochemical metering ratio is 'a', and 'a' satisfies: $1 \le a \le 4$. The method of the present disclosure uses the fuel cell system of the present disclosure, which optimizes the performance of a fuel cell and makes the output interruption time very short; hence it is highly beneficial for providing a more stable output.

10 Claims, 1 Drawing Sheet

FUEL CELL SYSTEM AND OPERATION METHOD THEREOF

FIELD

The present disclosure relates to fuel cell technology and, more particularly, to a fuel cell system and a method for operating the system.

BACKGROUND

Fuel cells can directly convert hydrogen and oxygen (usually the oxygen in the air) into electricity with high efficiency, and the byproduct of the reaction is water. Therefore, fuel cells may be characterized as energy-saving, environmentally friendly, etc.

In order to improve the output performance of fuel cells, there has been a technology proposed abroad named "Starvation", which reduces or even interrupts the oxygen supply within a short time, such as a few seconds, so that the oxygen supply cannot satisfy the needs of electrochemical reaction, and at the same time, the output voltage of fuel cells drops and even approaches 0V. The performance of fuel cells after Starvation obviously improves and recovers but will slide slowly down during the time of further use.

Since Starvation is not a permanent solution, it needs to be carried out frequently to keep the output performance of fuel cells at a high level. During the process of Starvation, the fuel cells have no output because of the reduction or interruption of the oxygen supply, as well as the voltage drop. Additionally, it is difficult to shorten the execution time of each Starvation process due to the need of regulation and control mechanical devices, such as fans/air dampers, to reduce or interrupt the oxygen supply. These weaknesses restrict the promotion and use of Starvation technology.

Therefore, there is an urgent need in this field to develop a new fuel cell system and the method for operating the system with high output performance.

SUMMARY

The purpose of the present disclosure is to provide a high output performance fuel cell system and a method for operating the system.

In one embodiment, a fuel cell system is provided according to the present disclosure. The system includes a fuel cell, a controller, a switch, an oxygen supply device and an output circuit. The fuel cell is a cathode enclosed fuel cell which includes an anode and a cathode.

The controller is electrically coupled to the switch, the oxygen supply device, and the fuel cell, and the fuel cell is electrically coupled to the output circuit. The controller is configured to drive control signal for adjusting the electrochemical metering ratio of oxygen flow, supplied by the oxygen supply device, to output current; wherein the electrochemical metering ratio is 'a', and 'a' satisfies:

Preferably, the oxygen supply device is a combination of devices comprising of an oxygen supply device or a compressed air cylinder, and a controllable pressure reducing valve.

In another embodiment, the switch is a Metal-Oxide-Semiconductor Field-Effect Transistor (MOSFET). The switch includes a source, a drain, and a gate. The switch may be directly connected to the anode and the cathode of the fuel cell. In another embodiment, the switch may be indirectly connected to the anode and the cathode of the fuel cell.

In another embodiment, the system further includes a voltage limiter, a fuse, a heat removal system, a drainage system, and a safety apparatus.

In a further embodiment, a diode is provided between the fuel cell and the output circuit. Additionally, a solid-state relay is provided between the fuel cell and the output circuit.

In another embodiment of the present disclosure, a method for operating the fuel cell system is provided according to the present disclosure. The method includes following steps:

(a) providing a fuel cell system which includes a fuel cell, a controller, switch, an oxygen supply system and an output circuit; wherein the fuel cell is a cathode enclosed fuel cell.

(b) closing the switch of the system;

(c) driving the controller to control the electrochemical metering ratio of the oxygen flow supplied from the oxygen supply device to the anode of the fuel cell to operating output current; wherein the electrochemical metering ratio is 'a', and 'a' satisfies: $1 \leq a \leq 4$;

(d) transferring the protons which exceed the electrochemical metering ratio under the normal operating oxygen supply will be transferred from the anode to the cathode through use of pulses; wherein the standard for determining the protons meeting the electrochemical metering ratio satisfying operating condition is to reduce the average voltage of a single cell to equal to or less than 0.2V; and (e) outputting current via the output circuit.

Preferably, the standard for determining the protons meeting the electrochemical metering ratio satisfying operating condition is to reduce the average voltage of a single fuel cell to equal to or less than 0.1V; more preferably, the standard for determining the protons meeting the electrochemical metering ratio satisfying operating condition is to reduce the average voltage of a single fuel cell to equal to or less than 0.05V. In a preferred embodiment, the electrochemical metering ratio 'a' satisfies: $1.4 \leq a \leq 2.8$.

In a further embodiment, the oxygen supply device is a combined apparatus comprising of an oxygen supply device or a compressed air cylinder and a controllable pressure reducing valve. The pulse width is D, and D satisfies $15 \text{ ms} \leq D \leq 100 \text{ ms}$. The pulse period is T, and T satisfies $5 \text{ s} \leq T \leq 30 \text{ s}$. In order to minimize the impact of output interruption, the pulse width and pulse period can be changed as a function of operating mode. More aggressive settings can be applied during periods of falling output demand and low output demand (decelerations and low power operation). Less aggressive settings should be applied during periods of increasing output demand and high output demand (accelerations and high-power operation). This concept can be extended to its limiting cases of completely on during idle and completely off during maximum acceleration and maximum continuous power operation.

The method for outputting current via the output circuit is cutting off the output of the fuel cell before the start of the pulse and resuming the output of the fuel cell after the end of the pulse.

DESCRIPTION OF THE DRAWINGS

The above, as well as other advantages of the present disclosure, will become readily apparent to those skilled in the art from the following detailed description, particularly when considered in the light of the drawings described hereafter.

Figure 1:
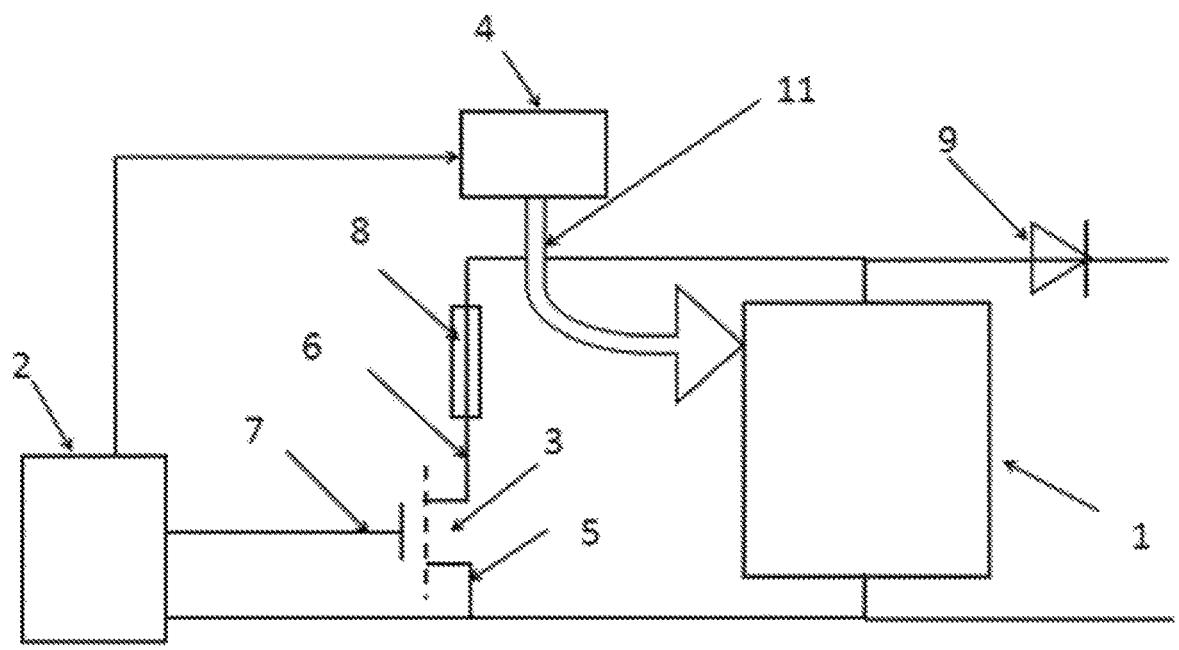
FIG. 1 illustrates a typical schematic diagram of the fuel cell system according to the present disclosure.

The reference numbers in each figure are denoted as follows: 1—fuel cell; 2—controller; 3—switch; 4—oxygen supply device; 5—source; 6—drain; 7—gate; 8—slow-blow fuse; 9—diode; 10—solid-state relay; and 11—air flow.

DETAILED DESCRIPTION

The following detailed description and appended drawings describe and illustrate various embodiments of the invention. The description and drawings serve to enable one skilled in the art to make and use the invention and are not intended to limit the scope of the invention in any manner. In respect of the methods disclosed, the steps presented are exemplary in nature, and thus, the order of the steps is not necessary or critical unless otherwise disclosed.

The present disclosure includes a method for operating fuel cells. The fuel cell used according to the method is a cathode enclosed fuel cell. This method can improve and recover the output performance of fuel cells due to the protons passing through the proton exchange membrane to the cathode, which do not obtain the necessary oxygen atom for a reaction into water, but rather forms hydrogen again. This hydrogen reduces/cleans the contaminated gas on the surface of catalyst, and/or reduces the oxidized catalyst. The method for operating fuel cells according to the present disclosure is as follows: The electrochemical metering ratio of oxygen supply to operating output current is less than 4 and greater than 1; the protons which exceed the corresponding metering ratio under the normal operating oxygen supply will be transferred from the anode to the cathode through the use of pulses. The standard for determining the protons exceeding the corresponding metering ratio under the normal operating oxygen supply is to reduce the average voltage of single fuel cell to less than 0.2V.

The method of the present disclosure does not require the reduction or interruption of oxygen supply. However, during the pulse period, the protons passing through the proton exchange membrane to the cathode can form hydrogen at the cathode because the protons are beyond what the reaction needs; hence the formed hydrogen can reduce/clean the contaminated gas on the surface of catalyst, and/or reduce the oxidized catalyst. The contaminated gas includes (but is not limited to) oxide, sulfide, carbon dioxide and volatile organic compound. The excess of protons/hydrogen does not necessarily indicate an overall excess but a possible partial excess. There may remain a small amount of oxygen in the passageway, but the remaining oxygen is not able to react with hydrogen immediately because of the transfer resistance. The pulse duty cycle is too small to significantly affect the power output.

As used herein, the term 'MOSFET' refers to "Metal-Oxide-Semiconductor Field-Effect Transistor". It is a field-effect transistor which can be widely applied in an analog circuit and a digital circuit.

The method of the present disclosure advantageously utilizes the fuel cell system of the present disclosure, which optimizes the performance of fuel cells and makes the output interruption time very short; hence it is highly beneficial for providing a more stable output.

Below with reference to specific embodiments, the present disclosure will be further elaborated. It shall be understood that these embodiments are merely used to explain the present disclosure and are not intended to limit the scope of the present disclosure.

It is to be noted that in the claims and specification of the present disclosure, the relation terms such as "first" and "second", etc., are merely used to distinguish one entity or operation from another, and do not necessarily require or imply that these entities or operations are actually of such relations or sequences. Moreover, terms "include", "contain" or other variations of such words are intended to cover a non-exclusive inclusion, so that a process, a method, an article or a device which includes a series of elements not only include these elements, but also include other elements that are not explicitly listed, or includes the inherent elements of the process, the method, the article or the device. Without more restrictions, the element defined by the term "include one", does not exclude the existence of other identical elements in the process, the method, the article or the device of the element.

As illustrated in FIG. 1, a first embodiment of the fuel cell system is shown according to the present disclosure. The fuel cell system includes a fuel cell 1, a controller 2, a switch 3, an oxygen supply device 4 and an output circuit. In this first embodiment, the oxygen supply device 4 is an oxygen supply fan. The controller 2 is coupled to the oxygen supply fan via a control line of the fan. The fuel cell 1 is a cathode enclosed fuel cell. The switch 3 is a MOSFET, which indirectly connects to an anode and a cathode of the fuel cell 1 respectively via a slow-blow fuse 8. The switch 3 includes a source 5, a drain 6 and a gate 7. The anode of the fuel cell 1 outputs to the external via a diode 9. During the pulse duration when the MOSFET is controlled to be switched on, the input capacitor, which the load may contain, will not be shorted, and other auxiliary external power supplies will not be shorted either. With the air flow 11 as the oxygen supply, the fuel cell controller 2 controls the oxygen supply device 4 and controls the electrochemical metering ratio of air flow 11 to operating output current at 2. The controller 2 of the fuel cell 1 supplies the MOSFET pulses, having a period of 10 s and a width of 30 ms, so that the MOSFET can be turned on during the pulse duration and transfers the protons exceeding the corresponding metering ratio under the normal operating oxygen supply from the anode to the cathode and forms hydrogen at the cathode. There are 40 single cells stacked in the fuel cells. The effective area of each single cell is 46 $cm^2$. The actual measured voltage during the limited voltage pulse is 1V, i.e., the average voltage of a single cell is 0.025V.

Figure 2:
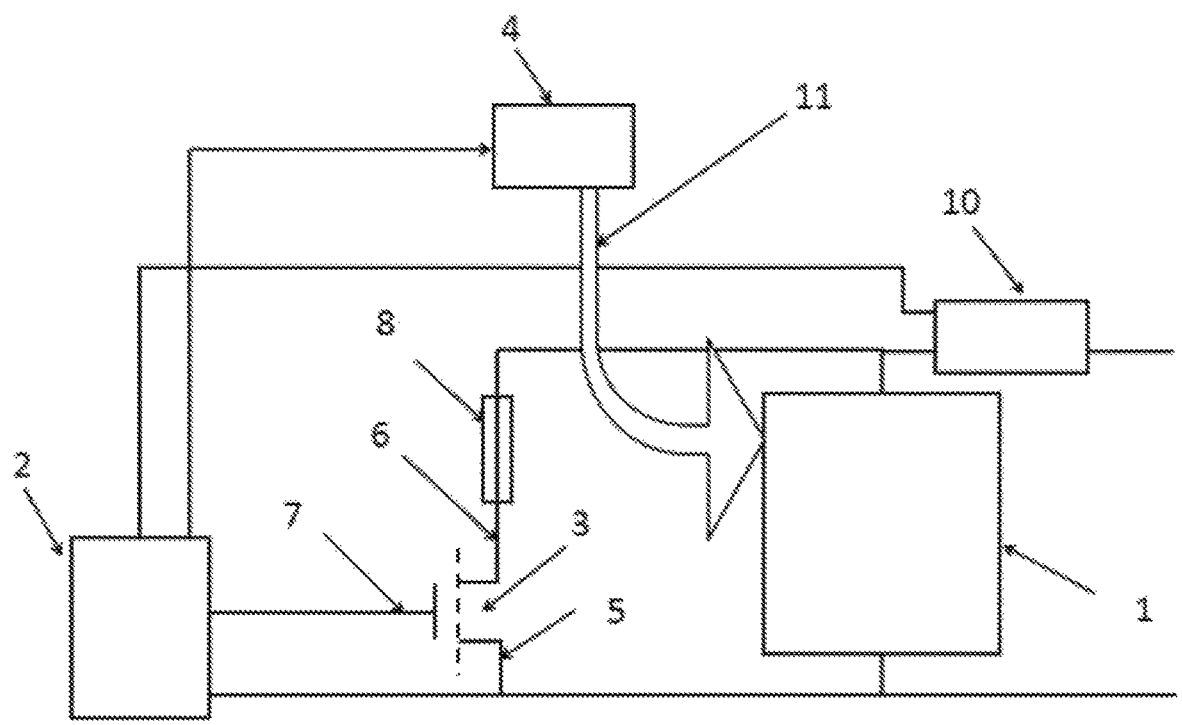
FIG. 2 illustrates another schematic diagram of the fuel cell system embodiment according to the present disclosure.

As illustrated in FIG. 2, a second embodiment of fuel cell system is shown according to the present disclosure. The fuel cell system includes a fuel cell 1, a controller 2, a switch 3, an oxygen supply device 4 and an output circuit. In this embodiment, the oxygen supply device 4 is an oxygen supply fan. The controller 2 is coupled to the oxygen supply fan via the control line of the fan. The fuel cell 1 is a cathode enclosed fuel cell. The switch is a MOSFET, which indirectly connects to an anode and a cathode of the fuel cell 1 respectively through a slow-blow fuse 8, and the switch 3 includes a source 5, a drain 6 and a gate 7. The anode of the fuel cell 1 outputs to the external via a solid-state relay 10, and this solid-state relay 10 is controlled by the fuel cell controller 2. With the air flow 11 as the oxygen supply; the fuel cell controller 2 controls the oxygen supply device 4 and controls the electrochemical metering ratio of air flow 11 to operating output current at 1.8. The controller 2 of the fuel cell 1 supplies the MOSFET pulses, having a period of 15 s and a width of 50 ms, so that the MOSFET can be turned on during the pulse duration and transfers the protons exceeding the corresponding metering ratio under the normal operating oxygen supply from the anode to the cathode and form hydrogen at the cathode. This fuel cell controller also controls the solid-state relay 10 by cutting off the output in advance, 5 ms prior to the 50 ms pulse width, and gets the solid-state relay 10 turned on again and enables the output at 45 ms after the end of the pulse. There are 40 single cells stacked in the fuel cell. The effective area of each single cell is 46 cm$^2$. The actual measured voltage during limited voltage pulse is 1V.

While certain representative embodiments and details have been shown for purposes of illustrating the disclosure, it will be apparent to those skilled in the art that various changes may be made without departing from the scope of the disclosure, which is further described in the following appended claims.

What is claimed is:

1. A fuel cell system, comprising:
a fuel cell, wherein the fuel cell includes an anode and a cathode, and the fuel cell is a cathode enclosed fuel cell;
a switch;
an oxygen supply device;
an output circuit, wherein the fuel cell is electrically coupled to the output circuit; and
a controller, wherein the controller is electrically coupled to the switch, the oxygen supply device, and the fuel cell,
wherein:
the controller is configured to drive a control signal for adjusting an electrochemical metering ratio of oxygen flow, supplied by the oxygen supply device, to output current,
the electrochemical metering ratio is 'a', and 'a' satisfies: 1≤a≤4, and
the controller is configured to operate the switch to supply at least one or more protons exceeding the electrochemical metering ratio under a normal operating oxygen supply, where the at least one or more protons are transferred from the anode to the cathode through at least one or more pulses, where the at least one or more protons at the cathode form hydrogen gas at the cathode.

2. The fuel cell system of claim 1, further comprising a fuse between the fuel cell and the switch.

3. The fuel cell system of claim 1, wherein the switch is a Metal-Oxide-Semiconductor Field-Effect Transistor (MOSFET).

4. The fuel cell system of claim 1, further comprising a diode between the fuel cell and the output circuit.

5. The fuel cell system of claim 1, further comprising a solid-state relay between the fuel cell and the output circuit.

6. A method for operating a fuel cell system, the method comprising the steps of:
providing the fuel cell system, including a fuel cell, a controller, a switch, an oxygen supply device, and an output circuit, wherein the fuel cell is a cathode enclosed fuel cell;
closing the switch of the fuel cell system;
driving the controller to control an electrochemical metering ratio of oxygen flow, supplied from the oxygen supply device to an anode of the fuel cell, to operating output current; wherein the electrochemical metering ratio is 'a', and 'a' satisfies: 1≤a≤4;
transferring at least one or more protons, which exceed the electrochemical metering ratio under a normal operating oxygen supply will be transferred from the anode to a cathode through the use of at least one or more pulses, where the at least one or more protons at the cathode form hydrogen gas; wherein a standard for determining at least one or more protons meeting an electrochemical metering ratio satisfying an operation condition is to reduce the average voltage of a single cell to equal to or less than 0.2V; and
outputting a current via the output circuit.

7. The method of claim 6, wherein the oxygen supply device includes a compressed air cylinder with a controllable pressure reducing valve.

8. The method of claim 6, wherein a pulse width is D, and D satisfies 15 ms≤D≤100 ms.

9. The method of claim 6, wherein a pulse period is T, and T satisfies 5 s≤T≤30 s.

10. The method of claim 6, wherein the method for realizing the output current via the output circuit is cutting off an output of the fuel cell before the start of the at least one or more pulses and resuming the output of the fuel cell after the end of the at least one or more pulses.

* * * * *